United States Patent
Dalsgaard

(10) Patent No.: US 9,140,239 B2
(45) Date of Patent: Sep. 22, 2015

(54) WIND POWER PLANT CONTROLLER FOR AVOIDING COMMON CAUSE SHUTDOWN

(75) Inventor: Søren Dalsgaard, Randers (DK)

(73) Assignee: Vestas Wind Sytems A/S, Aarhus N. (DK)

( * ) Notice: Subject to any disclaimer, the term of this patent is extended or adjusted under 35 U.S.C. 154(b) by 0 days.

(21) Appl. No.: 13/376,580

(22) PCT Filed: Dec. 7, 2010

(86) PCT No.: PCT/DK2010/050332
§ 371 (c)(1),
(2), (4) Date: Feb. 20, 2012

(87) PCT Pub. No.: WO2011/072689
PCT Pub. Date: Jun. 23, 2011

(65) Prior Publication Data
US 2012/0257968 A1    Oct. 11, 2012

Related U.S. Application Data

(60) Provisional application No. 61/286,415, filed on Dec. 15, 2009.

(30) Foreign Application Priority Data

Dec. 15, 2009 (DK) .................................. 2009 01327

(51) Int. Cl.
*F03D 7/04* (2006.01)
*F03D 7/02* (2006.01)

(52) U.S. Cl.
CPC ............ *F03D 7/0264* (2013.01); *F03D 7/0276* (2013.01); *F03D 7/0292* (2013.01);
(Continued)

(58) Field of Classification Search
CPC ... F03D 7/0264; F03D 7/0268; F03D 7/0276; F03D 7/0292; F03D 7/048; F05B 2270/1033; F05B 2270/1073; F05B 2270/304; F05B 2270/1095; F05B 2270/335; Y02E 10/723
USPC ............. 416/1, 31, 33, 36–38, 41, 44, 47–49, 416/61, 120; 290/44, 55
See application file for complete search history.

(56) References Cited

U.S. PATENT DOCUMENTS

| 2004/0258521 A1 | 12/2004 | Wobben |
| 2007/0018457 A1 | 1/2007 | Llorente Gonzalez |

(Continued)

FOREIGN PATENT DOCUMENTS

| DE | 102006021982 A1 | 11/2007 |
| EP | 1672778 A2 | 6/2006 |

(Continued)

OTHER PUBLICATIONS

Danish application search and exam report for application No. PA 2009 01327 dated Jul. 30, 2010.

(Continued)

*Primary Examiner* — Christopher Verdier
(74) *Attorney, Agent, or Firm* — Patterson & Sheridan, LLP

(57) ABSTRACT

A wind power plant, and its corresponding method of control, comprising a plurality of wind turbines and a power plant controller connected to at least a first and a second of the plurality of wind turbines, wherein the power plant controller is configured to detect a shutdown of the first wind turbine in response to current wind conditions, and wherein the power plant controller is further configured to control the second wind turbine such that an operating parameter of the second wind turbine is modified in response to detecting the automatic shutdown of the first wind turbine.

20 Claims, 2 Drawing Sheets

(52) U.S. Cl.
CPC ........ *F03D 7/048* (2013.01); *F05B 2270/1033* (2013.01); *F05B 2270/1073* (2013.01); *F05B 2270/1095* (2013.01); *F05B 2270/304* (2013.01); *F05B 2270/335* (2013.01); *Y02E 10/723* (2013.01)

(56) References Cited

U.S. PATENT DOCUMENTS

2008/0174180 A1* 7/2008 Jurkat et al. ................... 290/44
2009/0102195 A1* 4/2009 Altemark et al. .............. 290/44
2009/0224543 A1* 9/2009 Steudel et al. ................. 290/44

FOREIGN PATENT DOCUMENTS

| EP | 1770277 A1 | 4/2007 |
| EP | 2098725 A2 | 9/2009 |
| WO | 03012293 A2 | 2/2003 |

OTHER PUBLICATIONS

International search report and written opinion for application No. PCT/DK2010/050332 dated Oct. 18, 2011.

* cited by examiner

WIND POWER PLANT CONTROLLER FOR AVOIDING COMMON CAUSE SHUTDOWN

The present invention relates to the control of a wind power plant. In particular, the present invention relates to the control of a wind power plant such that a plurality of wind turbines are linked by a control method in order to avoid the wind turbines shutting down due to a common cause.

A wind power plant is a plurality of wind turbines and may also be know as a wind farm or a wind park.

A wind power plant may comprise two wind turbines, or even up to several hundred wind turbines. It is of course desirable to maximise the power output of the wind power plant but it is recognised that it is also necessary to keep the loads acting on the wind turbines within the design loads to avoid failures.

It is described in US 2004/0258521 how a wind power plant can be arranged such that an early warning system is provided. The wind conditions are measured in the region of a first wind turbine, and a second wind turbine situated downstream of the first wind turbine is controlled based on the wind measurements in the region of the first wind turbine. Therefore, if the wind conditions measured in the region of the first wind turbine are considered to endanger the first wind turbine, this information is communicated to the second wind turbine which will be controlled to take appropriate action so that the wind conditions will not endanger the second wind turbine. However, the use of wind sensors or load sensors as described in US 2004/0258521 may be prone to failures themselves.

It is an aim of the present invention to provide a wind power plant and a method so that wind turbine shutdown due to common cause events are minimised.

According to a first aspect of the present invention there is provided a wind power plant comprising a plurality of wind turbines, the power plant further comprising:

a power plant controller connected to at least a first and a second of the plurality of wind turbines;

the power plant controller comprising means for detecting a shutdown of the first wind turbine in response to current wind conditions;

the power plant controller further comprising means to control the second wind turbine such that an operating parameter of the second wind turbine is modified in response to a detection of a shutdown of the first wind turbine in response to current wind conditions.

By monitoring the wind power plant to determine if a first wind turbine has shutdown it is possible to modify an operating parameter of a second wind turbine such that the loads on the second wind turbine are reduced. This has the effect that it is less likely that the second wind turbine will also shutdown due to the same cause.

The power plant controller detects if a first wind turbine has shutdown in response to current wind conditions. Accordingly, no sensors are required that will monitor the wind conditions or the loads experienced by the first wind turbine. This results in a very safe system because it is not reliant on sensors. Instead, the only input to the power plant controller may be if a wind turbine has shutdown.

When the operating parameter of the second wind turbine is modified, this is an indicator of the harshness of the wind, rather than an indicator of the wind speed.

The wind power plant may comprise more than two wind turbines. The power plant controller may detect a shutdown of the first wind turbine and control all, or only some of, the remaining wind turbines in the wind power plant. The second turbine is generally downwind of the first wind turbine.

The power plant controller comprises means for detecting a shutdown of the first wind turbine in response to current wind conditions. This means that the power plant controller can monitor the first wind turbine and detect when it has shutdown or is in the process of shutting down due to current wind conditions. Such a shutdown may be caused, for example, by a wind gust or a sudden change in wind direction. These extreme wind conditions cause the first turbine to shutdown and not output any power in order to avoid damage to the first turbine.

The operating parameter of the second wind turbine may be the power output of the second wind turbine; and the power output of the second wind turbine is partially reduced in response to a detection of a shutdown of the first wind turbine in response to current wind conditions. When the power output of the second wind turbine is reduced, the second wind turbine is operated in a less aggressive mode which minimises the loads experienced by the second wind turbine. The power output of the second wind turbine may be reduced by pitching the rotor blades of the turbine so that they generate a reduced driving force. The power output of the second wind turbine is partially reduced so that the second wind turbine continues to generate power so that a common cause shutdown is avoided. However, there may be instances where it is necessary to shutdown the second wind turbine as well.

The operating parameter of the second wind turbine may be the rotational speed of a rotor; and the rotational speed of the rotor of the second wind turbine is partially reduced in response to a detection of a shutdown of the first wind turbine in response to current wind conditions. When the rotational speed of the rotor of the second wind turbine is reduced, the loads experienced by the second wind turbine are minimised. The rotational speed of the rotor of the second wind turbine is partially reduced so that the second wind turbine continues to generate power so that a common cause shutdown is avoided. However, there may be instances where it is necessary to shutdown the second wind turbine as well.

The second wind turbine may comprise a control unit and a drive train, the drive train having a reference rotational speed, and the control unit being configured to:

control the rotational speed of the drive train such that the rotational speed of the drive train is below a first rotational speed upper limit above the reference rotational speed in a first mode;

control the rotational speed of the drive train such that the rotational speed of the drive train is below a second rotational speed upper limit above the reference rotational speed in a second mode, where the first rotational speed upper limit is higher than the second rotational speed upper limit; and wherein the power plant controller controls the second wind turbine such that the control unit of the second wind turbine switches from the first mode to the second mode in response to a detection of a shutdown of the first wind turbine in response to current wind conditions.

The drive train comprises a generator and it may also include a gearbox. The component parts of the drive train have a predefined reference rotational speed at a given wind speed.

The second wind turbine may operate in a first or a second mode. In the first mode, the controller is tuned such that it operates with a loose control around the speed reference, i.e. the rotational speed of the drive train is allowed to deviate from the speed reference by a certain limit. The second mode involves a more aggressive tuning of the controller, so that the rotational speed of the drive train is kept closer to the reference speed compared to the first mode. Switching from the first mode to the second mode is advantageous because it allows the rotational speed of the drive train to follow more closely the reference speed. Although this may result in a higher fatigue loading in the short term, a common cause shutdown of the second wind turbine is avoided.

According to second aspect of the present invention there is provided a method of controlling a wind power plant comprising a plurality of wind turbines, the method comprising the steps of:

detecting a shutdown of a first wind turbine in response to current wind conditions;

controlling a second wind turbine such that an operating parameter of the second wind turbine is modified in response to a detection of a shutdown of the first wind turbine in response to current wind conditions.

Examples of the invention will now be described with reference to the accompanying drawings in which.

Figure 1:
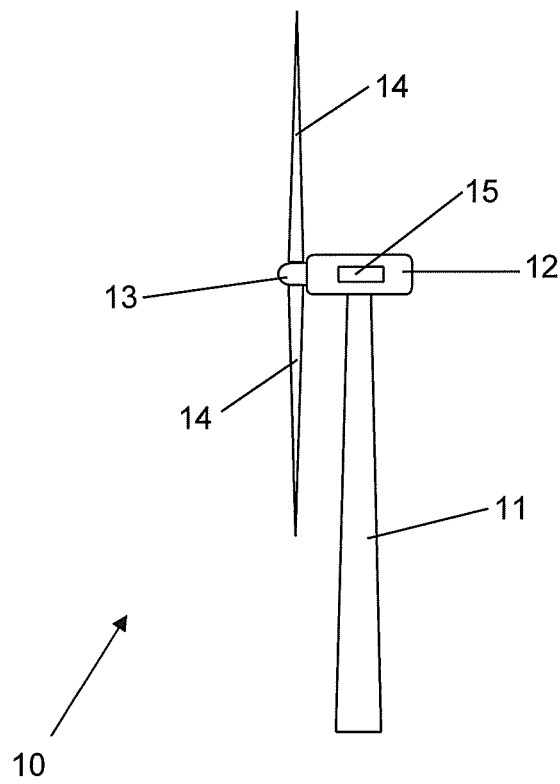
FIG. 1 shows a schematic view of a wind turbine.

FIG. 1 illustrates a view of a wind turbine 10. The wind turbine 10 comprises a tower 11, a nacelle 12 mounted on the top of the tower 11, a hub 13 mounted on the nacelle 12 and a plurality of blades 14 mounted to the hub 13. In this example (although not shown) the wind turbine comprises three blades 14, which form the rotor mounted to the hub 13. In use, wind impacts on the blades 14 causing them to rotate and a generator within the nacelle converts the kinetic energy of the blades 14 into electrical energy.

The wind turbine 10 is configured such that the rotor faces into the oncoming wind. Yaw motors (not shown) are located within the nacelle 12 which rotate the nacelle 12 about the longitudinal axis of the tower 11 such that the rotor faces into the incoming wind. The blades 14 may be pitched about their longitudinal axis by pitch drives (not shown) mounted in the hub. Such pitch drives may be hydraulic or electrical. A control unit 15 controls the operation of the wind turbine.

Figure 2:
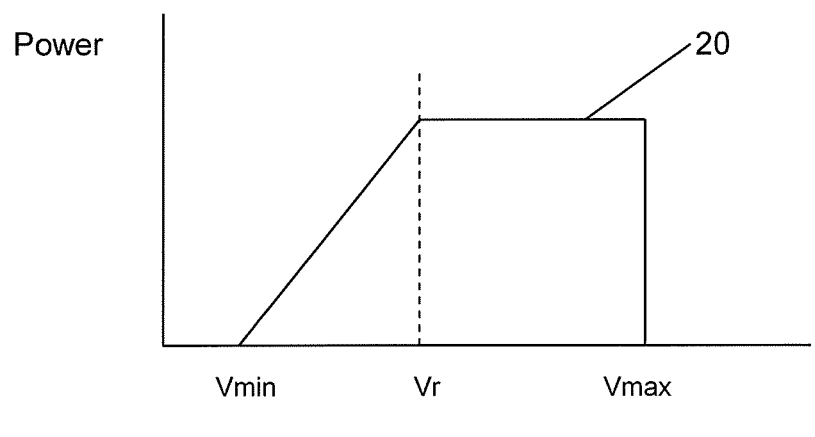
FIG. 2 shows a power curve for a wind turbine.

FIG. 2 illustrates a power curve of a typical wind turbine plotting wind speed on the x axis against power on the y axis. Curve 20 is the power curve for the wind turbine and defines the power output by the wind turbine generator as a function of wind speed. As is well known in the art, the wind turbine starts to generate power at a cut in wind speed Vmin. The turbine then operates under part load (also known as partial load) conditions until the rated wind speed is reached at point Vr. At the rated wind speed at point Vr the rated generator power is reached (also known as the nominal power). The cut in wind speed in a typical wind turbine is 3 m/s and the rated wind speed is 12 m/s. At point Vmax is the cut out wind speed; this is the highest wind speed at which the wind turbine may be operated while delivering power. At wind speeds equal to and above the cut out wind speed the wind turbine is shutdown for safety reasons, in particular to reduce the loads acting on the wind turbine.

When the wind turbine 10 is operating under part load conditions, the blades 14 are pitched at an angle about their longitudinal axis in order to maximise the energy capture from the oncoming wind. When the wind turbine is operating in the full load region, the pitch of the blades 14 is controlled so that the maximum rated power of the generator is not exceeded. In a pitch controlled wind turbine this is achieved by pitching the blades to feather which reduces the lift force of the blades and the energy recovered by the wind is reduced. In a stall controlled wind turbine, this is achieved by pitching the blades so that the airflow over the blades stalls and excess energy is released.

If the wind turbine 10 is subjected to a wind gust of high speed of above Vmax the wind turbine rotor may be forced into overspeed, that is the rotor rotates faster than a predetermined safe speed. This will cause an overspeed alarm in the control unit 15 of the wind turbine 10, and the blades 14 will be pitched very rapidly in order to bring the rotor to a standstill or idling speed, so that the wind turbine is shutdown—so that the loads experienced by the wind turbine are reduced.

Figure 3:
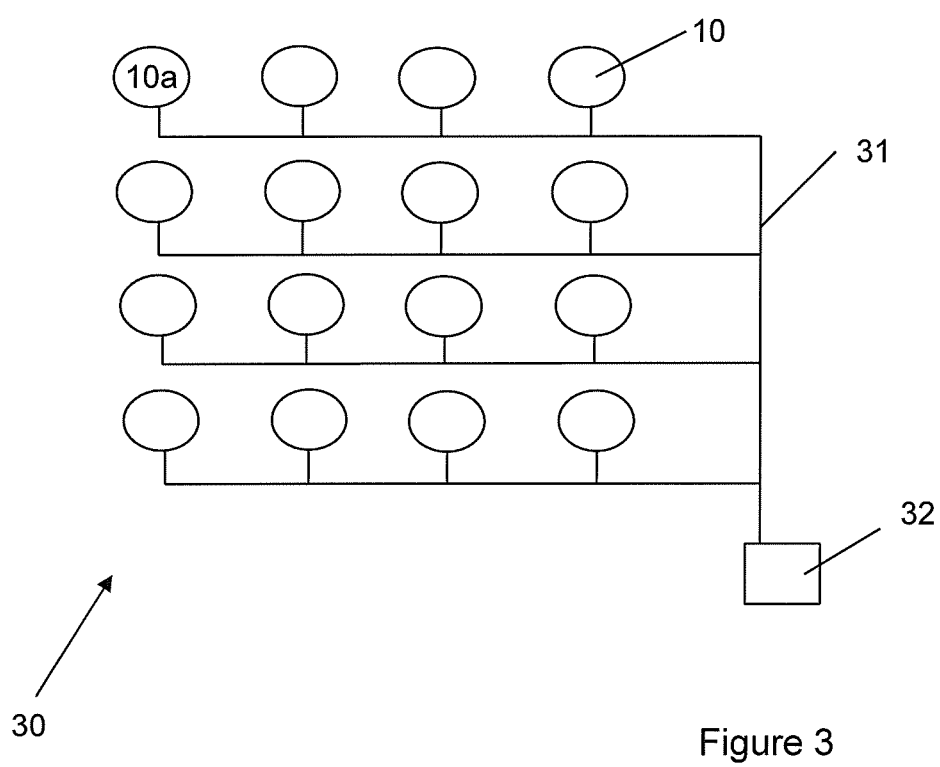
FIG. 3 shows a schematic view of a wind power plant.

FIG. 3 illustrates a schematic plan view of a wind power plant 30 comprising a plurality of wind turbines 10, in this case 16 wind turbines. Each wind turbine 10 is connected by a control link 31 to a power plant controller 32 which regulates the power output of the entire wind power plant 30.

In a first example, a wind turbine identified as 10a experiences a rotor overspeed which will indicate that a wind gust has hit wind turbine 10a. The wind turbine 10a communicates that it has undergone a shutdown procedure to the power plant controller 32 via the control link 31. The power plant controller 32 then sends a control signal to all of the other wind turbines in the wind power plant 30 instructing them to reduce their rotor speed. The control unit 15 in each wind turbine will reduce the rotor speed of each wind turbine which will also reduce the power generated by each wind turbine. Therefore, as the wind gust travels through the wind power plant 30, it is less likely that the remaining turbines will need to shutdown due to an overspeed condition because they have already reduced the rotor speed sufficiently such that overspeed is avoided. After a set period of time, the wind turbines may be returned to their normal operating speed.

Although the power output of each wind turbine 10 is temporarily reduced, the power output of the entire wind power plant 30 is increased over time as wind turbine shutdown due to a common cause event is avoided. Furthermore, this results in a lower life time loading of the wind turbines 10 in the wind power plant 30.

In a second example, wind turbine 10a shuts down due to an extreme yaw error. A yaw error occurs when the direction of the oncoming wind is not aligned with the horizontal axis of the rotor. Due to complex terrain on which the wind power plant 30 may be situated it is not feasible to automatically start yawing the remaining turbines in the wind power plant. However, as wind turbine 10a has experienced a shutdown due to an extreme yaw error it is likely that some "extreme" wind conditions will hit the remaining turbines in the wind power plant. Such "extreme" wind conditions may be, for example, a rapid change in wind direction. Information that wind turbine 10a has shutdown is communicated to the power plant controller 32 which then instructs the remaining wind turbines in the wind power plant 30 to reduce the speed of rotation of their rotors, which will reduce the power output of each wind turbine. This has the affect of reducing the severity of extreme yaw errors thus increasing the likelihood that the remaining wind turbine will not have to shutdown. This approach does not directly reduce the common cause alarms but reduces the common cause loading.

By reducing the power output of the wind turbines means that for a given wind speed, the power output by a wind turbine is less than that indicated according to the power curve of FIG. 2.

In a third example, the control unit 15 of the wind turbine 10 is configured to maintain the rotational speed of the drive train and the rotor within a certain rotational speed of a reference rotational speed, in other words a certain deviation in speed is allowed above and below the reference rotational speed. In a normal mode of operation, if the speed reference of the generator is 1500 rpm (revolutions per minute) the control unit 15 maintains the rotational speed of the generator within +/−150 rpm of the speed reference. By rotational speed of the generator is meant the rotational speed of the generator's rotor. As the rotational speed of the generator is allowed to deviate from the reference speed this results in less fatigue loading as the drive train can increase or decrease in speed in response to the current wind conditions.

However, the control unit 15 can also control the rotational speed of the drive train according to a more aggressive mode of operation. By a more aggressive mode of operation is meant that the rotational speed of the drive train is maintained within a smaller rotational speed band around the reference rotational speed. For instance, the control unit 15 maintains the rotational speed of the generator within +/−50 rpm of the speed reference. As the rotational speed of the drive train is more closely matched to the reference rotational speed this will cause a higher fatigue loading on the wind turbine components, in particular the tower and the main shaft.

In the third example, if wind turbine 10a experiences a rotor overspeed which will indicate that a wind gust has hit wind turbine 10a, the wind turbine 10a will communicate that it has undergone a shutdown procedure to the power plant controller 32 via the control link 31. The power plant controller 32 then sends a control signal to all of the other wind turbines in the wind power plant 30 instructing them to switch from the normal mode of operation to the aggressive mode of operation, such that the rotational speed deviation from the reference rotational speed is smaller, i.e. +/−50 rpm compared to +/−150 rpm. Therefore, as the wind gust travels through the wind power plant 30, it is less likely that the remaining turbines will need to shutdown due to an overspeed condition because their drive train speed is much closer to the reference speed. After a set period of time, the wind turbines may be returned to their normal operating speed. Although this may increase fatigue loading in the short term, a common cause shutdown of the wind power plant 30 is avoided and the risk of overspeed to the entire wind power plant is avoided. Furthermore, the fatigue damage caused by operating according to the aggressive mode for a set period of time may be far less than the damage caused by shutting down the wind turbine due to an overspeed.

In further examples, wind turbine 10a can record shutdown events owing to tower accelerations, tilt/yaw moments, a high DC voltage in the converter, or blade root bending moments, for example. In each example, an operating parameter of the remaining wind turbines in the wind power plant is modified such that the same problem is avoided. For instance, if wind turbine 10a shuts down because a high DC voltage is experienced in its converter unit, the DC voltage in the converter units in the remaining turbines is reduced to avoid the same problem.

As described above, a first wind turbine 10a experiences a shutdown in response to current wind conditions and the remaining turbines are controlled in order to avoid a common cause shutdown. The control of the remaining turbines in order to avoid a common cause shutdown may be for a predetermined period of time, such as two minutes.

Although the invention has been described with reference to the oncoming wind first hitting wind turbine 10a, all of the wind turbines in the wind power plant may be equipped to communicate shutdown events to the power plant controller 32.

The invention claimed is:

1. A wind power plant, comprising:
    a plurality of wind turbines; and
    a power plant controller connected to at least a first and a second of the plurality of wind turbines, wherein the power plant controller is configured to:
        in response to receiving information indicating that the first wind turbine has shut down in response to current wind conditions, cause the second wind turbine to modify an operating parameter, thereby preventing a shutdown of the second wind turbine caused by the current wind conditions.

2. The wind power plant of claim 1, wherein the operating parameter of the second wind turbine is one of power output of the second wind turbine and rotational speed of a rotor of the second wind turbine, and wherein modifying an operating parameter comprises partially reducing the operating parameter.

3. The wind power plant of claim 1, wherein the second wind turbine comprises a control unit and a drive train, wherein the drive train has a reference rotational speed, wherein the control unit is configured to:
    in a first mode, apply a first rotational speed upper limit for the drive train that is greater than the reference rotational speed; and
    in a second mode, apply a second rotational speed upper limit for the drive train that is greater than the reference rotational speed and less than the first rotational speed upper limit,
    wherein the power plant controller is further configured to, in response to receiving information indicating that the first wind turbine has shut down, cause the control unit of the second wind turbine to switch from the first mode to the second mode.

4. The wind power plant of claim 1, wherein the power plant controller does not receive input from a sensor configured to monitor the current wind conditions.

5. The wind power plant of claim 1, wherein the second wind turbine is situated downstream from the first wind turbine, wherein the current wind conditions comprise a wind gust at the first wind turbine, and wherein the wind gust has not reached the second wind turbine.

6. The wind power plant of claim 1, wherein shutdown of the first wind turbine is caused by one of a rotor overspeed and an extreme yaw error.

7. The wind power plant of claim 1, wherein shutdown of the first wind turbine is caused by one of a tower acceleration, a tilt/yaw moment, a high DC voltage in a power converter, and a blade root bending moment.

8. The wind power plant of claim 1, wherein the operating parameter is selected based on one or more causes of the shutdown.

9. The wind power plant of claim 1, wherein the power plant controller causes the second wind turbine to modify the operating parameter for a predetermined period of time after shutdown of the first wind turbine.

10. A method of controlling a wind power plant comprising a plurality of wind turbines, the method comprising:
    in response to receiving information indicating that a first wind turbine has shut down in response to current wind conditions, causing, via a power plant controller, a second wind turbine to modify an operating parameter, thereby preventing a shutdown of the second wind turbine caused by the current wind conditions.

11. The method of claim 10, wherein the operating parameter of the second wind turbine is one of power output of the second wind turbine and rotational speed of a rotor of the second wind turbine, and wherein modifying an operating parameter comprises partially reducing the operating parameter.

12. The method of claim 10, wherein the second wind turbine comprises a drive train, wherein the drive train has a reference rotational speed, the method further comprising:

applying, in a first mode and via a control unit of the second wind turbine, a first rotational speed upper limit for the drive train that is greater than the reference rotational speed;

applying, in a second mode and via the control unit of the second wind turbine, a second rotational speed upper limit for the drive train that is greater than the reference rotational speed and less than the first rotational speed upper limit wherein the power plant controller is configured to, in response to receiving information indicating that the first wind turbine has shut down, cause the control unit of the second wind turbine to switch from the first mode to the second mode.

13. The method of claim 10, wherein the power plant controller does not receive input from a sensor configured to monitor the current wind conditions.

14. The method of claim 10, wherein the second wind turbine is situated downstream from the first wind turbine, wherein the current wind conditions comprise a wind gust at the first wind turbine, and wherein the wind gust has not reached the second wind turbine.

15. The method of claim 10, wherein shutdown of the first wind turbine is caused by one of a rotor overspeed and an extreme yaw error.

16. The method of claim 10, wherein shutdown of the first wind turbine is caused by one of a tower acceleration, a tilt/yaw moment, a high DC voltage in a power converter, and a blade root bending moment.

17. The method of claim 10, wherein the operating parameter of the second wind turbine is selected based on one or more causes of the shutdown.

18. The method of claim 10, wherein the power plant controller causes the second wind turbine to modify the operating parameter for a predetermined period of time after shutdown of the first wind turbine.

19. A wind power plant control arrangement, comprising:
a plurality of control units, each control unit corresponding to a distinct wind turbine in the wind power plant; and
a power plant controller, configured to:
receive information from a first control unit of the plurality of control units indicating that a corresponding first wind turbine of the wind power plant has shut down in response to current wind conditions, and
in response to receiving the information, cause a second control unit of the plurality of control units, and corresponding to a second wind turbine of the wind power plant, to modify an operating parameter of the second wind turbine, thereby preventing a shutdown of the second wind turbine caused by the current wind conditions.

20. The wind power plant control arrangement of claim 19, wherein the second wind turbine is situated downstream from the first wind turbine, wherein the current wind conditions comprise a wind gust at the first wind turbine, and wherein the wind gust has not reached the second wind turbine.

* * * * *